United States Patent [19]

Nonclercq et al.

[11] Patent Number: 4,468,003
[45] Date of Patent: Aug. 28, 1984

[54] PROCESS FOR PULLING CABLES INTO CONDUITS

[76] Inventors: Bernard Nonclercq, Troguery; Pierre Le Cabec, Bourg-Pommerit-Jaudy, both of 22450 La Roche-Derrien; Francois Le Damany, Louannec, 22700 Perros Guirec, all of France

[21] Appl. No.: 355,604

[22] Filed: Mar. 8, 1982

[30] Foreign Application Priority Data

Mar. 10, 1981 [FR] France .................................. 81 04780

[51] Int. Cl.$^3$ .............................................. B65H 59/00
[52] U.S. Cl. ............................... 254/134.3 FT; 166/77
[58] Field of Search .............. 254/134.3 R, 134.3 FT, 254/134.4; 405/171; 175/65; 308/6 R, 6 A; 406/47, 49, 193, 117; 184/15 R; 15/104.3 SN; 198/493, 500; 166/280, 77, 54

[56] References Cited

U.S. PATENT DOCUMENTS

| 3,149,885 | 9/1964 | Walsh ................................... 406/193 |
| 3,559,739 | 2/1971 | Hutchison ............................ 166/77 |
| 3,582,142 | 6/1971 | Titus ..................................... 406/47 |
| 4,106,817 | 8/1978 | Tsuzuku et al. ...................... 406/49 |
| 4,412,673 | 11/1983 | Rumsden et al. ......... 254/134.3 FT |

FOREIGN PATENT DOCUMENTS

| 2457769 | 6/1976 | Fed. Rep. of Germany . |
| 1398590 | 3/1965 | France . |
| 2234482 | 1/1975 | France ....................... 254/134.3 FT |

Primary Examiner—Robert C. Watson
Attorney, Agent, or Firm—Larson and Taylor

[57] ABSTRACT

A method for reducing the friction between a conduit and a cable while the latter is pulled into the conduit consists of locating a layer of balls on the surface of the conduit or cable before laying. The balls have a diameter much lower than that of the cable, typically of the 0.1 to 1 mm range. The balls may be adhered to the cable as it progresses into the conduit, using for instance electrostatic forces. The balls may as well be blown into the conduit to form a carpet before the cable is forced into the tube. In both cases, friction is reduced whatever the angular portion of the conduit which is contacted by the cable during pulling.

6 Claims, 6 Drawing Figures

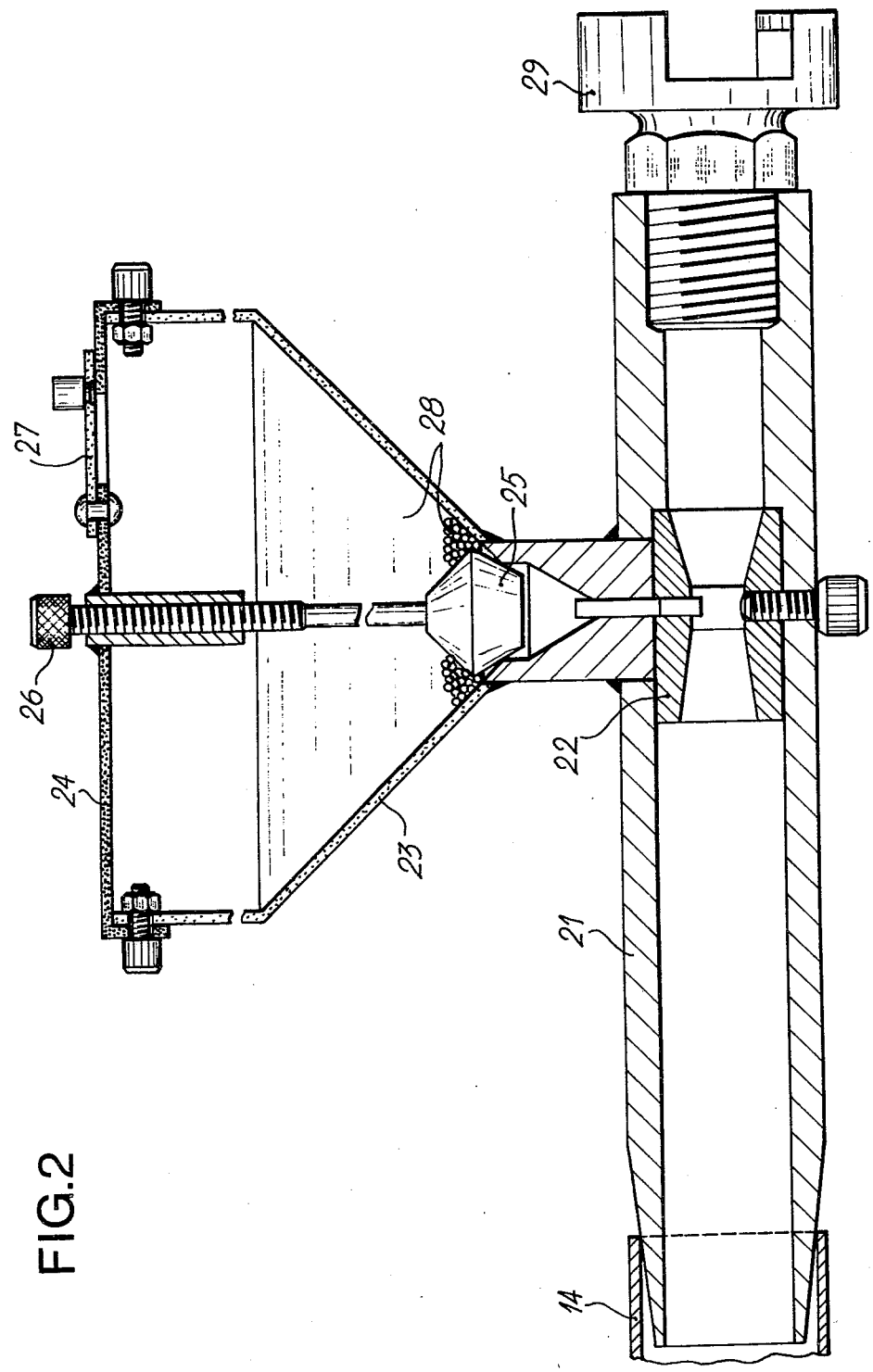

PROCESS FOR PULLING CABLES INTO CONDUITS

BACKGROUND AND SUMMARY OF THE INVENTION

The present invention relates to the field of cablelaying by forcing them into a conduit. It is particularly suitable for use in laying optical fiber telecommunication cables whose properties are likely to be detrimentally affected by the tension stresses required to pull the cable.

The conventional methods for laying cables, particularly in the individual pipes of multitubular conduits, are severely restricted as regards the lengths. The maximum distance is typically 300 m, 600 m in a few favorable instances. The factor limiting the pulling lengths is the friction between the outer cover of the cable and the wall of the conduit, which itself determines the pulling forces to be exerted at the end of the cable.

Numerous attempts have been made to reduce the friction between cable and conduit. Lubrication has been provided by placing a neutral grease between the conduit and the moving cable or by injecting an oil mist into the conduit before pulling. The pulling force has also been distributed along the cable and the force applied at the end of the cable correspondingly alleviated by propelling the cable by mechanical relaying means also called "pulling dogs", having friction drive rollers. Such pulling dogs are spaced along the path of the cable.

Such prior art approaches have drawbacks. Lubricating a conduit is a long and tiresome operation and the reduction of the friction coefficient is partly offset by adhesion of the cable to the conduit, due to the grease. The grease prevents the use of pulling dogs, for their rollers would slide on the cable. The latter drawback also exists in the case of oil mist lubrication. Pulling dogs can only be used for "dry" working and the use thereof is costly, since they are all the closer since the friction coefficient is increased due to dry working.

It is an object of the invention to provide a process for pulling cables, particularly optical fiber cables, into conduits which is improved as compared with the prior art methods; it is a more particular object to decrease the friction forces between the cable and conduit as the cable is pulled or otherwise moved along the conduit. It is still another object to authorize pulling large individual stretches of cable.

For that purpose, there is provided a method of locating a cable in a tubular conduit wherein, before the cable is pulled along said tubular conduit, a layer of balls having diameters substantially lower than the cable diameter is formed between the cooperating surfaces of the cable and the conduit and adhered to at least one of the cable and conduit to minimize the friction.

The word "adhered" should be construed as meaning that the balls are retained against the cable or conduit by forces which may be overcome, particularly for authorizing rolling friction or movement from one location to another. In other words, it does not mean that the balls are held fast or sticked by a process such as gluing which, after the glue has dried or cured, would not permit relative movement between the balls and the cable or conduit without permanently completely freeing the balls.

That method is a radical departure from the proposal in U.S. Pat. No. 4,232,981 to LEE, in which it is proposed to form a bed of balls or beads on part of the surface of a conduit. For that purpose, LEE suggests to flow a mixture of liquid and beads which are either more dense or less dense than the liquid for coating the lower or upper portion of the conduit. However, under practical conditions, a cable pulled along a conduit may rub on any portion of the surface of the conduit, particularly when the conduit is of relatively low diameter. That situation occurs when pulling optical fiber cables into multitubular conduits which typically have a diameter not higher than 100 mm. An additional limitation of LEE is that it is often impossible and always difficult to pump a liquid in a cable conduit. Last, most conduits are designed for not being immersed in water.

The forces to be exerted are much reduced as compared with conventional methods, since rolling friction replaces sliding friction; the length of the individual stretches of cable can be increased; the possibility of using pulling dogs is maintained, which may be more spaced than in the prior art techniques, which results in appreciable sparing: it suffices to remove the balls before passing the cable over the rollers of the pulling dogs, for example by means of brushes. In practice, the laying lengths are limited only by the capacity of the cable reels or the limitation in the manufacture of individual lengths of cable.

The balls used will generally be of synthetic material, typically polyamide or polyethylene. The diameter may vary within a fairly wide range. In practice, their diameter may be of from 0.1 mm (below which the defects of geometry or roughness of the conduits become preponderant) to a diameter of about 0.1 mm, beyond which difficulties are met for positioning the balls and forming a bed or carpet. In practice, the balls will generally not have a uniform diameter. The size distribution, which moreover the manufacture tolerances impose, seems beneficial: the smaller balls remain in the places of high friction whereas the larger ones are forced to the sides, which increases the angular zone of the cable carried by the balls. Classes of balls may further be provided, from which a choice will be made depending on the diameter of the cable to be pulled. By way of example, a class may be provided whose diameter is comprised between 0.1 (or better still 0.2) and 0.4 mm and a class of from 0.4 to 1 mm. The density will typically be of from 0.8 to 0.9.

Balls will be advantageously chosen whose diameter is in proportion to the diameter of the cable. For a cable having a diameter between 15 and 30 mm, the first class mentioned above may be used; for a cable having a diameter between 60 and 80 mm, the second above-defined class may be used. For intermediate diameters, balls may be used whose size distribution is of from 0.2 to 0.5 mm.

The balls may be positioned by a number of different processes. When the balls are of electrically insulating material, they may be caused to adhere to the outer cover of the cable as the latter advances by causing the cable to pass through a zone loaded with balls after electric charges have been deposited on the insulating cover of the cable. Adherence may also be caused by damping the cover. The carpet of balls may also be formed on the wall of the conduit by blowing balls as a suspension in air from one end of the conduit, blowing being carried out under a variable pressure, first high for propelling the balls into the part furthest from the injection point, then under reduced pressure. In most cases, the conduit wall is of dielectric electrically insulating material (such as PVC) and the balls will be retained against the wall of the conduit by electrostatic force.

As a general rule, the balls will be of a material having a hardness less than that of the outer cover of the cable and less than that of the conduit, to avoid damage resulting from their action.

As indicated above, the invention does not exclude the use of pulling relays. The laying may be carried out by pulling the endmost part of the cable and by driving the cable along by means of relays placed at distributed points spaced apart along the conduit. Then, the major part at least of the balls carried along by the cable is removed upstream of each relay and the balls are replaced or re-injected downstream of the relay.

The invention will be better understood from the following description of particular embodiments of the invention, given by way of examples only.

SHORT DESCRIPTION OF THE DRAWINGS

FIG. 2 is a sectional view of a device for injecting balls into the conduit, for carrying out a process according to a first embodiment of the invention;

DETAILED DESCRIPTION OF PREFERRED EMBODIMENTS

Figure 1:
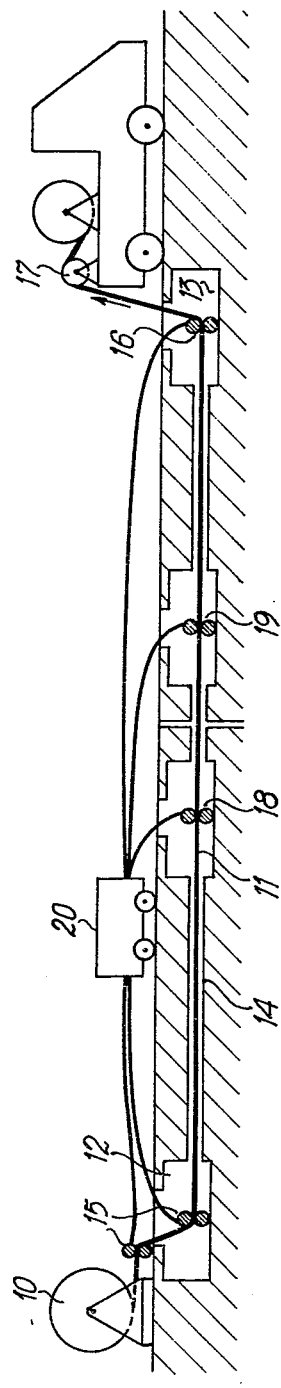
FIG. 1 is a simplified diagram showing cable pulling over great lengths, using pulling relays in accordance with a conventional prior art process.

Before the invention is described, it may be useful to give a short description of how cable pulling over great lengths is carried out at the present time under "dry" conditions. An apparatus of the kind shown in FIG. 1 is used. The reel 10 of cable 11 to be laid is placed close to the access 12 from which the cable is to be pulled towards a chamber 13, in a conduit 14 which is generally multitubular (i.e. includes several parallel tubes for receiving separate cables). Two sets of rollers 15 and 16 are provided for guiding the cable at the inlet of the conduit and a pulling small diameter steel rope at the outlet. A winch 17 is used to exert a pulling force on the rope. The apparatus shown in FIG. 1, suitable for pulling large stretches of cable, comprises intermediate pulling relays 18 and 19. A central electric control 20 is provided to synchronize the driving actions of the different rollers.

This conventional process allows cable stretches to be pulled over lengths which depend on the cable but can hardly exceed 600 m except under particularly favorable conditions. Moreover, the forces to be exerted on the cable and the stresses to which it is subjected are high. The two disadvantages are particularly serious when laying optical fiber cables, for the splices required at the end of each section result in losses and the stresses exerted on the cables may modify their characteristics. The problem of losses becomes all the more acute when for transmission at high wave-lengths, equal to or greater than 1.3 $\mu$m.

Arrangements will now be described which currently allow a 5-fold increase in pulling lengths.

In all embodiments which will now be described, a carpet of balls is formed between the cable and the conduit, the balls being made from a material slightly less hard than that of the conduit and than that of the outer cover of the cable. The conduit is frequently of polyvinyl chloride, whereas the outer cover of the cable is of high density or low density polyethylene. Then balls of polymer material having a lower than 1 density will generally be used. It is of advantage to select a material whose friction coefficient is relatively low; then, if some balls are crushed, the friction forces generated by sliding rather than rolling movement remain small for the area over which friction is exerted is only the sum of the surfaces of the crushed balls.

As mentioned above, the balls may be located in the conduit before introduction of the cable or adhered to the cable progressively as it enters the conduit.

Referring to FIG. 2, a device for distributing the balls or beads with satisfactory homogeneity all along the conduit operates by pneumatic injection. The device comprises a tubular body 21 in which is formed a venturi 22. One of the ends of the body is shaped to fit into conduit 14. The other end has a standard type connector 29, for receiving a pressurized air delivery pipe. A reservoir 23 in the form of a hopper having a lid 24 is connected to body 21. A conduit connecting the lower part of the reservoir 23 to the throat of the venturi is formed with a seat cooperating with a closure member 25. A threaded rod carries member 25, projects outside the lid 24 and has a knurled knob 26 for manual adjustment of the position of the closure member. A rotary flap 27 is provided to close or open an aperture provided in lid 24. The reservoir is typically of transparent material to allow visual monitoring of the level of the body of balls 28 in it. The venturi 22 and lid 24 may be secured by screws for easy removal.

The process of the invention may be carried out with the device of FIG. 2 as follows. The device is placed at an end of conduit 14 in which it is desired to form a carpet of balls. Connector 29 is connected to a source of pressurized air having a pressure reducing valve. The section of conduit over which the carpet of balls is to be formed is then defined, for example by locating an end grid. An air pressure of from 6 to 7 bars will frequently be satisfactory with a conduit of current diameter (42 to 100 mm).

Balls are placed in the device 28 whose nature and size range are selected depending on numerous parameters, such as the nature of the outer cover of the cable and of the conduit, the roughness of the conduit wall and the diameter of the cable. Balls having an average diameter of about 1/100 the diameter of the cable will frequently give good results. However, it is preferable not to have diameters below 0.1 mm, due to the roughness of current conduits, and not to exceed 1 mm, due to the need to transport the balls. Preferably, the balls are of a material of lower than 1 density for easier distribution.

The carpet of balls is then formed progressively starting from the zone of the conduit remote from the device. For that, balls are injected under an air pressure which is reduced progressively as the carpet is being formed. The flowrate of balls is controlled by adjusting the closure member 25. Thus, a carpet of balls is obtained sufficiently even to avoid the presence of gaps. Practice has shown however that, when balls of relatively large diameter are used, that result is only reached if the injection pressure is gradually reduced during positioning. Since the balls are drawn by the depression at the throat of the venturi, the variation of driving pressure will generally have to be compensated for by adjusting the passage cross-sectional area for the balls. Friction against the wall deposits electrical charges on the balls which stick to the wall when settled.

Tests carried out under conditions representative of actual cable pulling in a rectilinear conduit with a tractive force exerted only on the cable end (i.e. according to the least expensive technique), have shown that the friction coefficient is reduced in considerable proportions. The table below shows the friction coefficients for pulling a cable of 52 mm outer diameter into a polyvinyl chloride (PVC) conduit of 80 mm diameter.

|  | High density polyethylene | Low density polyethylene |
|---|---|---|
| Dry pulling | 0.25 to 0.35 | 0.40 to 0.60 |
| Oiled cable | 0.10 to 0.15 | 0.20 to 0.30 |
| Cable on bed of microballs | 0.045 to 0.06 | 0.05 to 0.06 |

It will be appreciated that, whatever the quality of the polyethylene forming the outer cover of the cable, the friction coefficient is divided approximately by 5 with use of the invention.

Due to that reduction, in homogeneous conduits, the stretches which can be pulled have a length increased by a factor which will be generally between 4 and 6.

Figure 3:
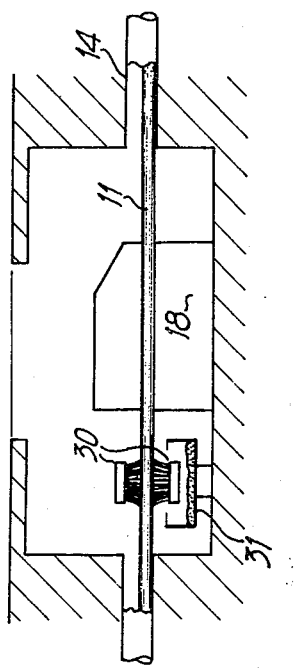
FIG. 3 is a simplified diagrammatic view showing a device for removal and recovery of part at least of the balls, for use with a pulling relay.

If the pulled cable is to pass through several intermediate access chambers in which are disposed pulling relays (as shown in FIG. 1), the formation of a sleeve of balls between the driving rollers of the relays and the outer cover of the cable should be avoided. For that purpose, a fraction at least of the balls coating the cable may be removed and recovered by suitable means. In the embodiment shown in FIG. 3, recovery is by means of a set of stationary brushes 30 on which the cable rubs before it is gripped by pulling relay 18. A tank 31 collects the balls detected by the brushes.

If the conduit has a winding, serpentine or irregular path, a water or oil mist may further be injected into the conduits so that the balls stick to all walls of the conduit rather than settle preferentially onto the lower part thereof. Thus, the friction is reduced even when the cable bears against the sides or the top part of the conduit. But then the pulling forces should be carried out at the end of the cable only.

Figure 4:
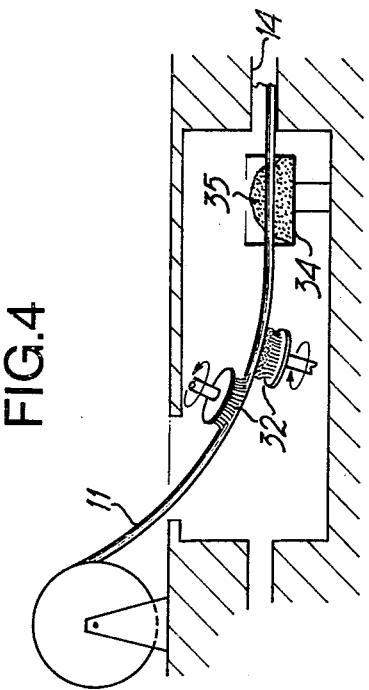
FIGS. 4, 5 and 6 are simplified diagrams showing devices for forming a carpet of balls by depositing balls on the cable progressively as it is pulled (FIGS. 4 and 5) or in the conduit before pulling (FIG. 6).
Figure 5:
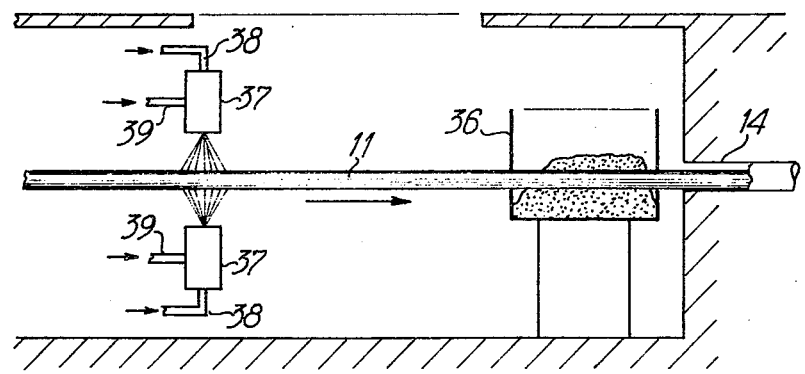

In the modified embodiment shown in FIGS. 4 and 5, the balls are placed on the cable before the latter enters the conduit. The balls may be caused to adhere to the cable by any suitable means, particularly electrostatically (provided that the balls and the ouver cover are electrically insulating) or moisting them.

The electrostatic process is extremely simple. As shown in FIG. 4, electrostatic charges are deposited on cable 11 by rotating brushes 32 of insulating material. Along the path of the cable, the rotary brushes 32 are placed upstream of a reservoir 34 accomodating balls 35 and having through holes for the cable. Such a system may be associated with that shown in FIG. 3 for removing the balls in the intermediate access chambers. A supplemental ball depositing system is then located at the outlet of each access chamber.

In the embodiment shown in FIG. 5, cable 11 is coated with a water mist by spraying at a location situated upstream of a ball reservoir 36 which it passes through before penetrating into conduit 14. Damping may be achieved by conventional sprays 37 having a compressed air supply 38, which transform the water delivered through supply pipe 39 into a mist of fine droplets.

Instead of passing the cable through a reservoir 34 or 36, the cable may be passed through a zone in which there is maintained a rain of microballs coming from a hopper. This solution generally allows a more homogeneous coating to be obtained. However, like the preceding one, it cannot be used to form a bed of balls having a diameter close to the upper 1 mm limit mentioned above.

Figure 6:
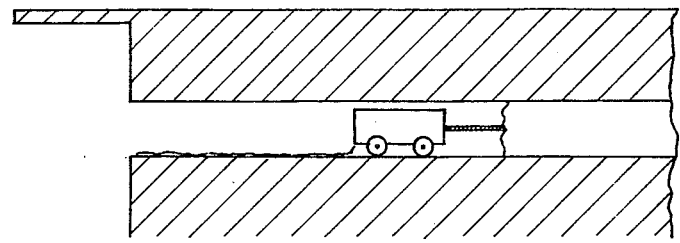

Solutions may be used other than blowing balls to form a bed in the conduit before pulling the cable; however, blowing seems to be most advantageous. As shown in FIG. 6, a reservoir for distributing balls may be drawn along the conduit by a rope. This approach has however the disadvantage of being time-consuming and of forming a bed only in the lower portion of the conduit, so that the friction against the top portion of the conduit is not significantly reduced. It will be of interest for medium length paths only.

Numerous modifications of the described method will appear to those skilled in the art. For instance, the conduit may be flexible as well as rigid; injection of balls may be made using any suitable gas rather than air; devices other than those specifically described may be used.

We claim:

1. A method of locating a cable in a tubular conduit, including the steps of: forming a layer of balls having diameters substantially lower than the cable diameter and adhering to the inner surface of said tubular conduit, throughout the surface of the conduit by blowing an air flow in which said balls are in suspension along said conduit under conditions selected to distribute said balls throughout the length of said conduit; and pulling the cable along said conduit on said layer.

2. A method of locating an optical cable having an envelope of a predetermined diameter in a section of tubular conduit of dielectric material, comprising the steps of: blowing a flow of gas in which balls of dielectric material less hard than the materials of the envelope and conduit and of diameter of from 0.1 to 1 mm are suspended along said section from an end thereof until a field of said balls is formed on and adhered electrostatically to substantially the whole surface and throughout the length of said section; and pulling said cable along said section after said field has been completed.

3. A method according to claim 1, wherein said air flow is blown under a pressure which is progressively decreased as said field is formed beginning from the far end of the conduit.

4. A method according to claim 1, or 2, wherein said balls are of a material selected from the group consisting of polyamide, polyester and polyethylene material.

5. A method according to claim 1, wherein said balls have diameters selected in the range of from 0.1 mm to 1 mm and are of different diameters within said range.

6. A method according to claim 1, wherein a mist is injected into said tubular conduit for sticking said balls on the surface of said tubular conduit.

* * * * *